2,706,496

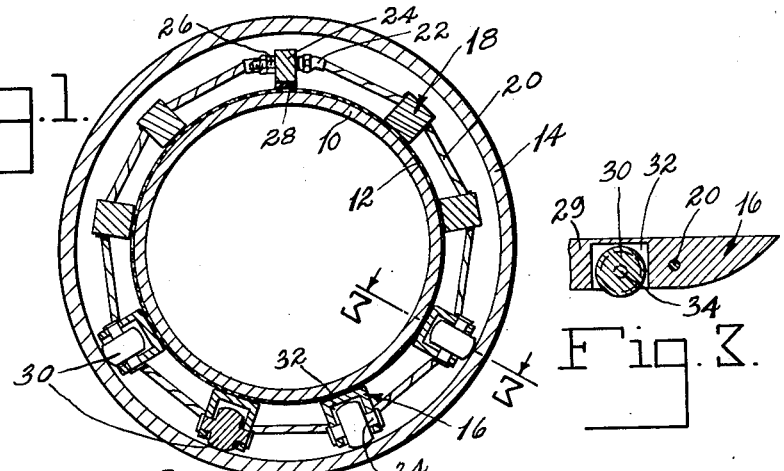
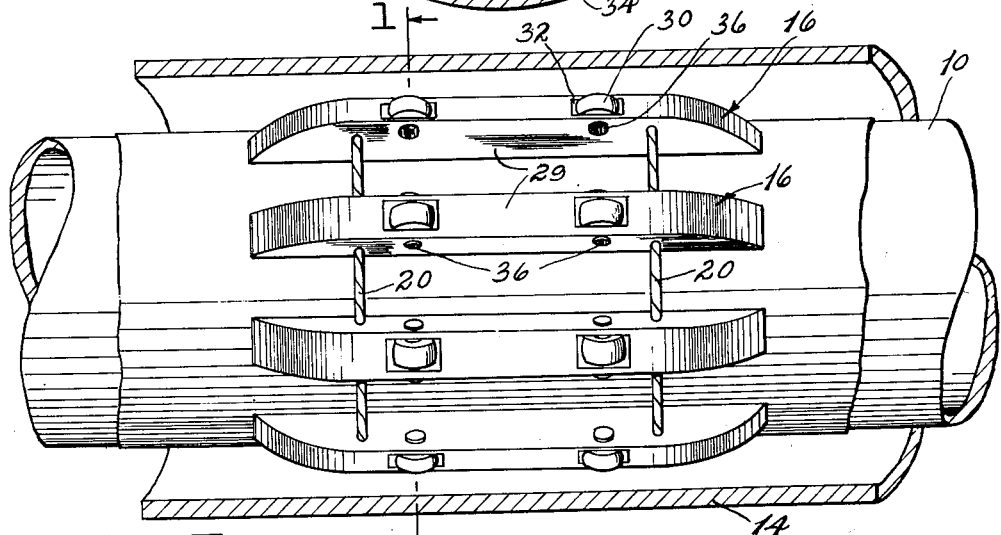
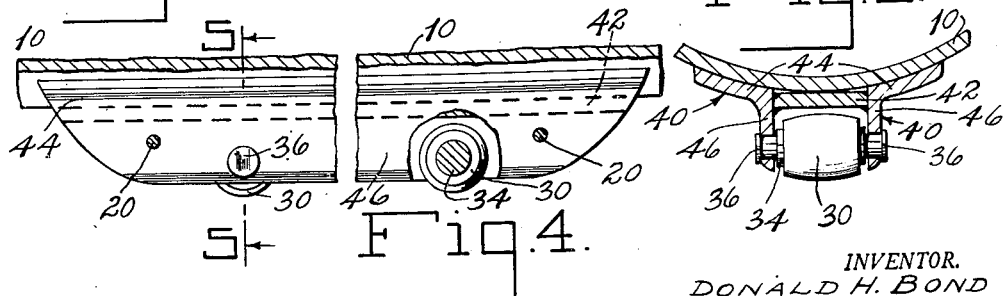
Fig. 1. Fig. 2. Fig. 3. Fig. 4. Fig. 5.
INVENTOR.
DONALD H. BOND
BY
ATTORNEY

United States Patent Office 2,706,496
Patented Apr. 19, 1955

CONCENTRIC PIPE INSULATOR AND SPACER

Donald H. Bond, Houston, Tex., assignor to The Texas Company, New York, N. Y., a corporation of Delaware Application May 29, 1952, Serial No. 290,795

1 Claim. (Cl. 138—65)

The present invention relates to a pipe insulating system, and more particularly to devices for electrically insulating and spacing a fluid conducting pipe concentrically within another pipe.

The present invention is specifically concerned with the construction of pipe lines for conducting oil, gas, and the like, and contemplates a device adapted to accurately space and center the fluid conducting pipe within an outer pipe casing and to electrically insulate the pipes from one another throughout their lengths. Due to such insulation, it has been found possible to greatly reduce the power requirements when cathodic protection is applied to the pipe line for preventing corrosion thereof.

In accordance with the present invention, a plurality of sets or groups of insulator or spacer members are disposed in parallel to and in separated relation about the periphery of the longitudinal axis of the inner pipe. The spacing members are caused to grip, clamp or firmly engage the inner pipe in clamping relation by means of at least one elongated tensioning element which connects laterally with the spacer members and is provided with means for drawing up on its extremities to tighten the spacer members firmly against the inner pipe. The lower spacer members, that is those disposed below the central axis of the pipe, are provided with at least one antifriction roller extending below, that is beyond the lower surface of the spacer member, in a direction radially with respect to the pipe axes, into contact with the inner surface of the outer pipe casing to support the inner pipe concentrically therein. The spacer members are, moreover, constructed and arranged to electrically insulate the respective pipes from one another. For example, either the roller member or the body portion of the spacer member is formed of a material of high dielectric and mechanical strength with low moisture absorption properties. Also, the journal means for the roller may be likewise formed of insulating material or an insulating member may be interposed between the spacer member and the inner pipe. In any event, there is no electrically conductive path between the inner pipe and the outer pipe, preferably between the inner pipe and the spacer members.

The present invention is of particular advantage in the case of concentric inner and outer pipe casing arrangement installed under rivers, canals, highways, railroads and the like where a substantial length of a fluid conducting pipe must be drawn or pushed into operative position within the casing, usually at a subsurface location and where the frictional forces are substantial.

Obviously, the antifriction rollers minimize the frictional resistance to disposition of the inner pipe within the outer casing, particularly where the casing does not lie in a straight line. The present invention, accordingly, makes it possible to center the fluid conducting pipe within another pipe while providing a minimum of frictional resistance, preventing damage to either of the pipes and avoiding damage or displacement of the insulating device.

For a better understanding of the invention, reference is had to the drawing in which Fig. 1 is a cross section taken on the line 1—1 of Fig. 2 through a group of spacer elements arranged between an inner pipe and outer pipe casing; Fig. 2 is a longitudinal view, partly in section showing the group of spacer elements in place; Fig. 3 is a sectional detail view taken on the line 3—3 of Fig. 1; Fig. 4 is a detail elevation of an alternative form of spacer member; and Fig. 5 is a cross section taken on the line 5—5 of Fig. 4.

In the drawing a pipe 10, which may be a section of an oil or gas pipe line, has a coating 12 of a material such as asphaltum and/or kraft paper, and is coaxially disposed within an outer pipe or casing 14 which may rest upon or be buried in the earth.

At desired intervals throughout the length of the pipe a number of groups or sets of insulating or spacer members are positioned along the outer surface of the inner pipe.

In the embodiment shown in Figs. 1–3 the spacer members 16 and 18 are formed of a relatively elongated bar of a material which is square or rectangular in cross section and may vary in length depending upon the size of the pipe involved.

Each of the members 16 and 18 lies parallel to the axis of the inner pipe, and the several members of each group are spaced uniformly and peripherally about the circumference thereof, and fixedly clamped or gripped against the inner pipe by means of elongated tensioning elements 20. The tensioning elements shown comprise a length of stranded steel cable 20 passing laterally through the spacer elements 16 and 18 as shown. The ends of each cable are provided with threaded studs 22, swaged, welded or otherwise affixed thereto. Instead of a cable, tensioning elements may, however, be formed of a metal rod, bar, strip or other elongated and preferably flexible material and provided with threaded extremities or with threaded studs as above.

To tension the cable and clamp the members 16 and 18 against the pipe, a tensioning bar or element 24 is provided. Whereas the spacer members 16 and 18, in the embodiment shown, are each provided with two apertures to receive cables 20, the tensioning bar 24 is provided with four apertures to accommodate the threaded end portions or fittings 22. Thus, the threaded extremities of each tensioning element 20 extend oppositely through the adjacent pair of apertures in the member 24, and are fitted with nuts 26. As the nuts 26 are screwed up upon the studs or fittings 22, the extremities of the cable are oppositely drawn up and tightened against the opposite lateral surfaces of the member 24. Therefore, the tightening of the nuts 26 causes the spacer members of each group to be drawn toward the inner pipe and clamped firmly against its surface so that there is little likelihood of any of the members becoming twisted or loosened.

It is contemplated spacing the extremities or end fittings of each tensioning member or cable 20 relatively closely together where they pass through the tensioning bar 24 to avoid forces tending to rotate or displace bar 24 from its desired position parallel to the pipe. Moreover, as shown in Fig. 2, it is contemplated spacing the respective cables or tensioning members 20 substantially in a direction axially of the pipe to counteract any such displacing torque. The bar 24, moreover, for obvious structural reasons, is advantageously formed of a metal such as steel, and it is, therefore, contemplated attaching a layer of dielectric material to its inner surface as at 28 to insulate it electrically from the inner pipe.

Each of the spacer members 16 as shown in Figs. 1–3 is formed of an elongated bar or body member 29, the height of which is somewhat less than the distance between the outer surface of the coating 12 and the inner surface of the casing 14, rollers 30 being provided to contact casing 14.

Rollers 30 are journaled transversely within recess 32 for rotation about an axis extending laterally of the spacer member. Thus, in the embodiment shown, each roller 30 is mounted upon a shaft 34 which extends through the body portion 29 of the spacer member 16 on either lateral side of the recess 32. The extremities of shaft 34 are upset as at 36 to retain the shaft in position. Obviously, in view of the foregoing, the roller may be journaled upon shaft 36, and/or the shaft may be journaled in block 29, antifriction bearings, not disclosed, being advantageously employed. In any event, the antifriction roller 30 projects downwardly below the lower surface of the block 16, supporting the group of spacer members, and the inner pipe within casing 14 as shown in Fig. 1.

The inner pipe is, therefore, carried upon rollers 30 clamped firmly thereto, and, accordingly, adapted to be moved axially into operative position with a minimum of friction resistance.

Also, in the embodiment shown, the upper bars 18 are substantially less in height than the spacers 16, providing ample clearance to prevent engagement with the inner surface of outer pipe 14. If desired, the bars 18 may likewise be provided with antifriction rollers.

In order to provide for electrically insulating the inner pipe, the spacer members 16 may comprise an electrically insulating material, for example, a high dielectric and mechanical strength material with low moisture absorption properties, such as the phenolic condensation product, Bakelite. Where the body member 29 is so constructed, the rollers 30 and their journals may be formed of a high tensile material such as steel. Alternatively, however, the rollers or journals may be formed of electrically insulating material while the body portions of the spacing members are composed of a conductive material. It is important that at least one of these members, and if desired all, be constructed of the high dielectric insulating material so that the inner pipe and preferably the tensioning members are insulated from at least one of the pipes.

In accordance with one modification, a spacing or insulating layer may be provided on the inner surfaces of the spacer members 16 and 18 in the manner of the dielectric layer 28 on the tensioning bar 24. With such a construction, therefore, the spacer members need not necessarily be non-conductive in their entirety.

Referring to the somewhat modified embodiment disclosed in Figs. 4 and 5, each of the spacer members 16 is built up of a pair of spaced, parallel angle members 40, welded to the opposite side margins of a longitudinally extending plate or strip 42 as shown in Fig. 5. Base or inner flanges 44 of the angle members are preferably formed with arcuate inner faces to seat on the outer surface of the inner pipe 10. The outwardly extending spaced flanges 46 thereof, serve to journal the rollers 30. As in the previous embodiment, the rollers 30 are carried upon shaft 34 extending through flanges 46, retained in position by upsetting the shaft as at 36.

Longitudinally spaced apertures provided in the side flanges 46 receive the cable 20, also as in the previous embodiment.

In the present embodiment, it is contemplated forming the roller of high dielectric strength insulating material so that the body portion of the spacer member may be fabricated of metal pieces. Alternately, the inner surface of the spacer member may be provided with an electrically insulating layer or section as above.

In any event, the insulating assembly provides a rugged carrier upon which the inner pipe 10 is movable axially into the outer pipe with a minimum of frictional resistance. It is preferred fixedly positioning spacing members 16 and 18 upon the tensioning member 20 to avoid displacement and maintain them in parallelism with the pipe axes. This is accomplished by forcing members 16 and 18 into position upon the cable 20 or by pins, not shown, driven into the receiving apertures alongside of the cable. Each of the spacer members is preferably tapered or arcuately curved toward the inner pipe at its extremities to ride over any irregularity or other impediment in the outer casing.

In general, any desired number of spacer members may be used in any group. Advantageously, a sufficient number is selected to support the weight of the particular pipe line, to maintain it in essentially concentric relation to the casing, and to space the cable 20 from contact with the pipes. Ordinarily, the spacer groups are disposed at desired intervals along the length of the pipe, effective to give the required support.

Obviously, many modifications of the invention as hereinbefore set forth may be made without departing from the original spirit and scope thereof, therefore, only such limitations should be imposed as are indicated in the appended claim.

I claim:

A device for uniformly spacing and electrically insulating an inner fluid conducting pipe from an outer pipe casing comprising a plurality of spacer members arranged parallel to the longitudinal axis of said pipe and in spaced relation to one another, a first group of said spacer members having a height equal to the desired annular space between said pipe and said casing, said first group of spacer members being so positioned as to lie on one side of a diameter of said pipe when secured thereon, the rest of said spacer members forming a second group having a lesser height so as to provide clearance when inserting into a casing a pipe carrying said spacer members; means for rigidly clamping said members to said inner pipe comprising at least one elongated tensioning element connecting laterally with said spacer members and provided with means for drawing up at its extremities to tighten said members against said inner pipe, said spacer members being adapted to space said tensioning element from contact with said inner pipe; each spacer member of said first group comprising a body member of electrically insulating material having at least one recess therein extending in from the outer surface thereof, said recess having end walls and side walls, and an anti-friction roller member journalled on a laterally extending axis of rotation within said recess, said roller member projecting from said recess to engage the inner surface of said outer pipe casing to roll thereon during insertion of said inner pipe into said outer pipe casing.

References Cited in the file of this patent

UNITED STATES PATENTS

| 1,122,130 | Lamson | Dec. 22, 1914 |
| 1,906,209 | Harding et al. | Apr. 25, 1933 |
| 2,551,867 | Bond | May 8, 1951 |

FOREIGN PATENTS

| 419,944 | Italy | Apr. 14, 1947 |